Feb. 4, 1930. R. J. EVANS 1,746,110
BRAKE LINING
Filed Feb. 21, 1929
*Fig.1.* *Fig.2.* *Fig.3.* *Fig.4.*
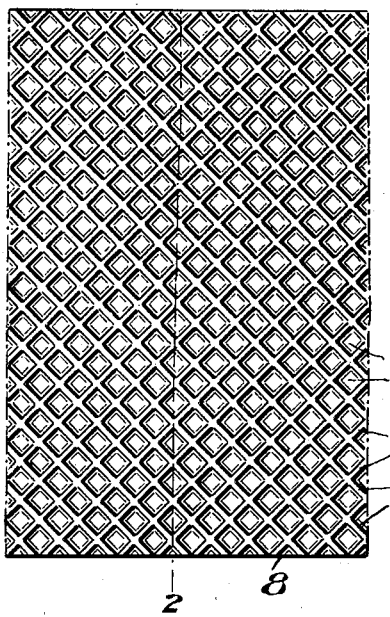 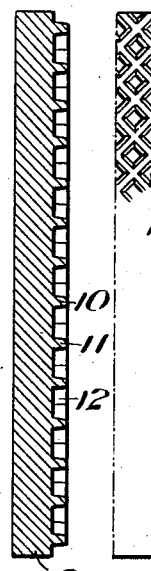 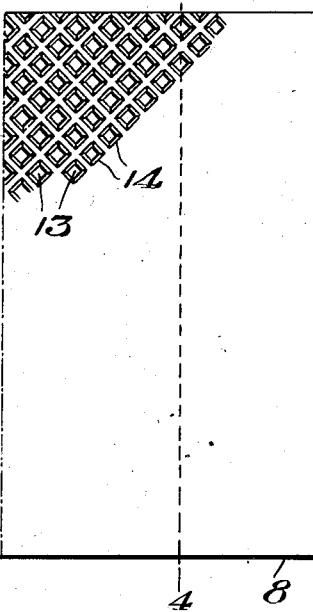 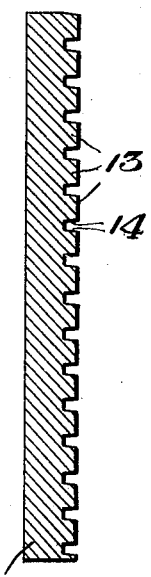
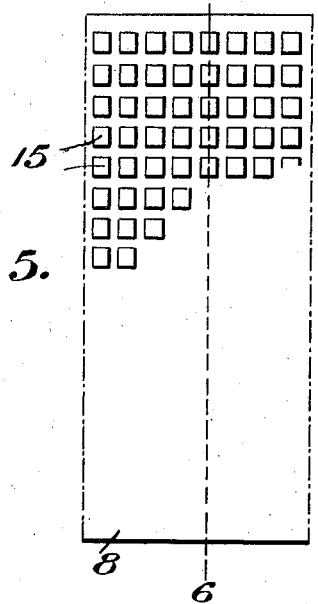 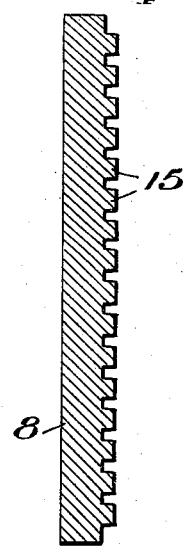
*Fig.5.* *Fig.6.*

Inventor
R. J. Evans
By Wilkinson & Giusta
Attys.

Patented Feb. 4, 1930

1,746,110

UNITED STATES PATENT OFFICE

RICHARD J. EVANS, OF HUNTINGTON, INDIANA, ASSIGNOR TO ASBESTOS MANUFACTURING COMPANY, OF HUNTINGTON, INDIANA, A CORPORATION OF INDIANA

BRAKE LINING

Application filed February 21, 1929. Serial No. 341,807.

The present invention relates to improvements in brake lining, and has for an object to provide an improved lining, which will more readily adapt itself to the drum or other element of the brake mechanism.

It is well understood among makers and users of automobiles that some considerable time is required after the assembly of new cars, or the relining of the brakes of old cars, before the brake lining surface is worn down, so as to make complete contact at all points with the brake drum or the brake band as the case may be. A loss of efficiency is entailed where the brake lining does not contact throughout its entire area with the objective surfaces of the brake mechanism.

It is another object of the invention to provide an improved brake lining with surfaces, so constructed as to wear down quickly and readily on the first few applications of the brake, so that all parts of the exposed surfaces are even or at least correspond with the objective surfaces of the brake mechanism, so that the brakes will, almost from the outset, attain a degree of one hundred percent efficiency.

A further object of the invention is to accomplish the above purposes in a brake band, which will be susceptible of molding or manufacturing in accordance with existing practices and without adding to the expense of present manufacture.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a plan view of a portion of a brake band showing one form of the invention.

Figure 2 is a section taken on the line 2—2 in Figure 1.

Figure 3 is also a plan view of a slightly modified form of brake band.

Figure 4 is a section thereof on the line 4—4 in Figure 3.

Figure 5 is a further plan view showing a further modification of the band.

Figure 6 is a section taken on the line 6—6 in Figure 5, and

Figure 7:
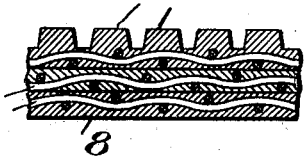
Figure 7 is a section taken on an enlarged scale through the brake band showing the reinforcing means.

Referring more particularly to the drawings 8 represents the body of a brake lining which may contain the reinforcing structure 9 shown in Figure 7. The body 8 may be composed of any material now used for the purpose.

In accordance with the present invention a raised surface is made on the brake band, which is of a character to wear down rapidly on application of the brake.

This raised surface, as shown in Figure 1, is composed of relatively thin projections or bars 10 and 11 extending diagonally of the brake lining,—spaced from one another and intersecting to form the cavities 12, which are illustrated to be of rectangular form, but which may be of any other form desired.

As shown in Figures 3 and 4 the raised surface is constituted of a number of rectangular projections 13, preferably arranged in diagonal rows across the face of the brake lining. These projections 13 are spaced from one another in the rows and in adjacent rows and preferably are formed with sloping sides 14, so that the base portions of the projections are thicker than the outer free end portions thereof.

As shown in Figures 5 and 6, the projections 15 are approximately rectangular in construction without the tapering side walls and being arranged in transverse and longitudinally intersecting rows, instead of in the diagonal rows shown in Figure 3.

Obviously many other forms of projection could be used, and it is understood that I reserve the right to any form or design of projection providing a raised surface on a brake band. The raised surface is, of course, not reinforced and is constructed of a material, for instance rubber and asbestos which will wear down rapidly upon the application of the brakes.

The surfacing of the brake lining may be either by molding, together with the body of the brake lining, or it may be by the use of a nurling tool or machine.

After the brake lining has been put in place, and the brakes applied, the nurled or raised surface will break down at once forming a complete contact with the drums at all surface portions of the brake lining. The improved brake lining will also take care of the unevenness that is often found in either the shoe or band that the lining is attached to. With present linings, it takes quite a lot of dragging or wearing off of the lining before a stage of perfect contact is reached. Some manufacturers grind the surface after the lining is applied to the brake shoe to even the surface. The present invention will eliminate this extra labor and give better and quicker results.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved brake lining comprising a reinforced body, and an unreinforced raised surface adapted to wear down readily on application of the brake.

2. An improved brake lining comprising a reinforced body, and non-reinforced small projections standing out from the body and wearable down readily by friction of the band with the brake element to automatically and quickly seat the band to the brake elements to secure at the outset maximum efficiency of the brake.

RICHARD J. EVANS.